Dec. 26, 1939.                C. HUENLICH                    2,184,367
                    PHONOGRAPH RECORD SHAVING MACHINE
                         Filed July 1, 1938           2 Sheets-Sheet 1

INVENTOR
Charles Huenlich
BY
Henry Lanahan
ATTORNEY

Dec. 26, 1939.   C. HUENLICH   2,184,367
PHONOGRAPH RECORD SHAVING MACHINE
Filed July 1, 1938   2 Sheets-Sheet 2
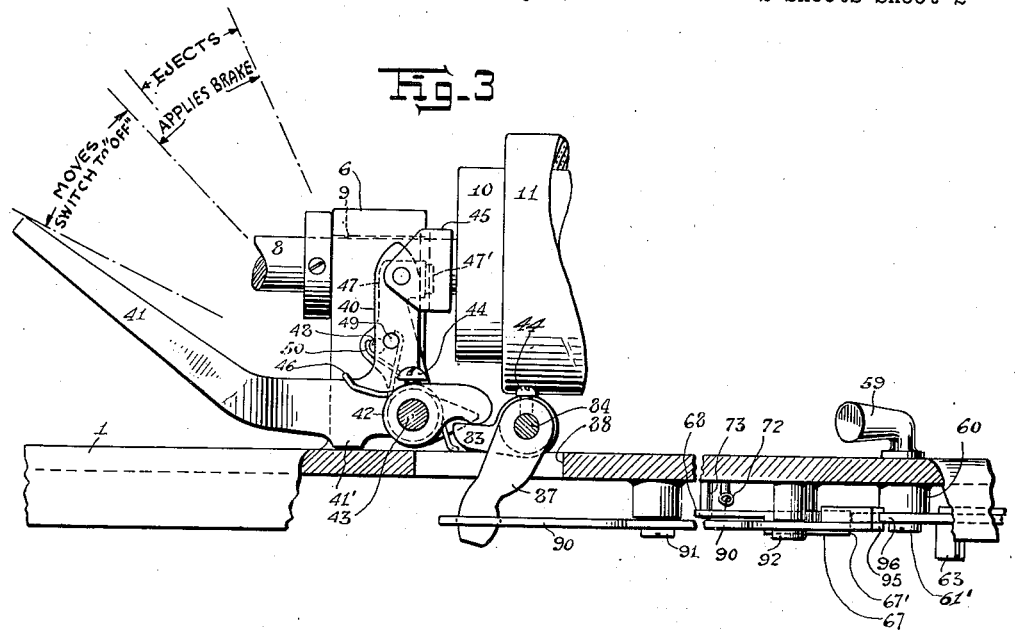
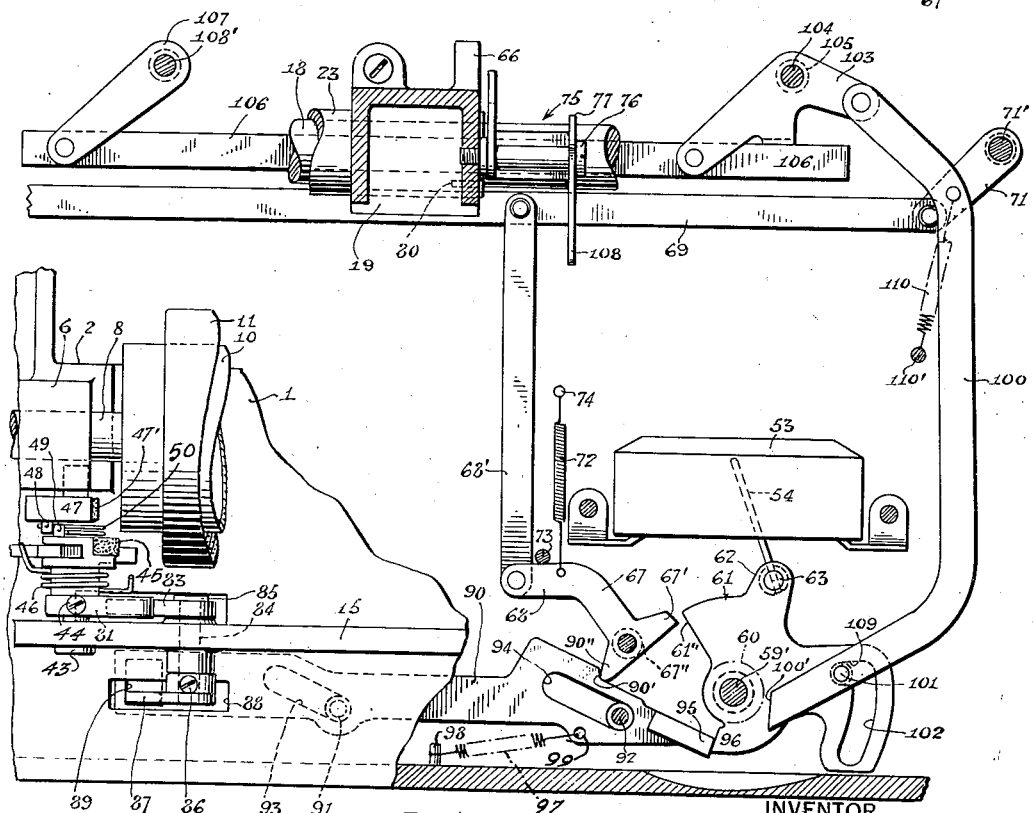
INVENTOR
Charles Huenlich
BY Henry Lanahan
ATTORNEY Patented Dec. 26, 1939

2,184,367

UNITED STATES PATENT OFFICE 2,184,367

PHONOGRAPH RECORD SHAVING MACHINE

Charles Huenlich, Bloomfield, N. J., assignor to Thomas A. Edison, Incorporated, West Orange, N. J., a corporation of New Jersey Application July 1, 1938, Serial No. 216,887

18 Claims. (Cl. 82—1.1)

This invention relates to machines for shaving or resurfacing phonograph records principally of the type intended for use with dictating machines. It is especially concerned with the provision of means for facilitating the operation of the machine and for constraining the operator from inadvertently performing operations which may cause damage to the machine or to the records to be resurfaced. In some respects this invention has certain features in common with those disclosed in my copending application Serial No. 251,658, filed January 19, 1939, and entitled Phonograph record resurfacing machines.

A record shaving machine typically comprises means for rotating a record, and a carriage having a resurfacing tool mounted thereon for movement into operative and inoperative positions with respect to the record. The carriage may be fed, as from an initial position to a terminal position across the record, for effecting a tool-record traversal. When the tool is in operative position and the record is set into rotation, such tool-record traversal will effect a resurfacing, or a cutting away of a surface layer, of the record. At the end of the resurfacing the machine may be stopped, as by a suitable means for controlling its operation, and the record may be removed from the machine as by a suitable record ejector. The operation of mounting a phonograph record on a record shaving machine, resurfacing the record, and removing the record from the machine thus requires that a series of manipulations be performed in a suitable selected sequence. Departures from this sequence may result in damage to the machine or to the records to be resurfaced. Such proper sequence can be insured by the provision of suitable means for locking some manipulative parts against operation until certain other manipulative parts are in suitable positions. Moreover some manipulative parts may be automatically operated incidental to the operation of others for rendering the machine more conveniently operable.

It is an object of my invention to provide, in record shaving machines, a control means which is automatically operated to stop and start the machine as the carriage is moved into and out of its terminal position, and which is also automatically operated as an incident of removing a record from the machine so that the machine will remain stopped irrespective of the position into which the carriage may be moved.

It is another object of my invention to provide, in record shaving machines, a control means which is automatically operated to stop and start the machine as the carriage is moved into and out of its terminal position, and which is also manually operable when the resurfacing tool is out of operative position for maintaining the machine in a stopped condition irrespective of the position of the carriage.

It is another object of my invention to provide, in a record shaving machine, means which compel the release of the resurfacing tool from operative position before a "start" and "stop" controlling means for the machine can be manually operated into "stop" position.

It is another object of my invention to provide, in record shaving machines, means whereby the resurfacing tool is released from operative position and a "start" and "stop" control means for the machine is operated into "stop" position as an incident of ejecting a record from the machine.

It is another object of my invention to provide, in record shaving machines, means for operating a "start" and "stop" controlling means for the machine into "stop" position as an incident of removing a record from the machine.

Other and allied objects will more fully appear from the following description and the appended claims.

In the description of my invention reference is had to the accompanying drawings, of which:

Fig. 3 is a front elevational view, partly in cross-section and partly broken away, of portions of the machine of Fig. 1, showing the means for automatically operating the manual control switch of the machine to stop position as an incident of operating the record ejecting means;

Fig. 4 is a top plan view, partly in section and partly broken away, of such portions of the machine of Fig. 1 as will serve to show the operative connection between the manual control switch of the machine and the resurfacing tool and record ejector respectively.

Figure 1:
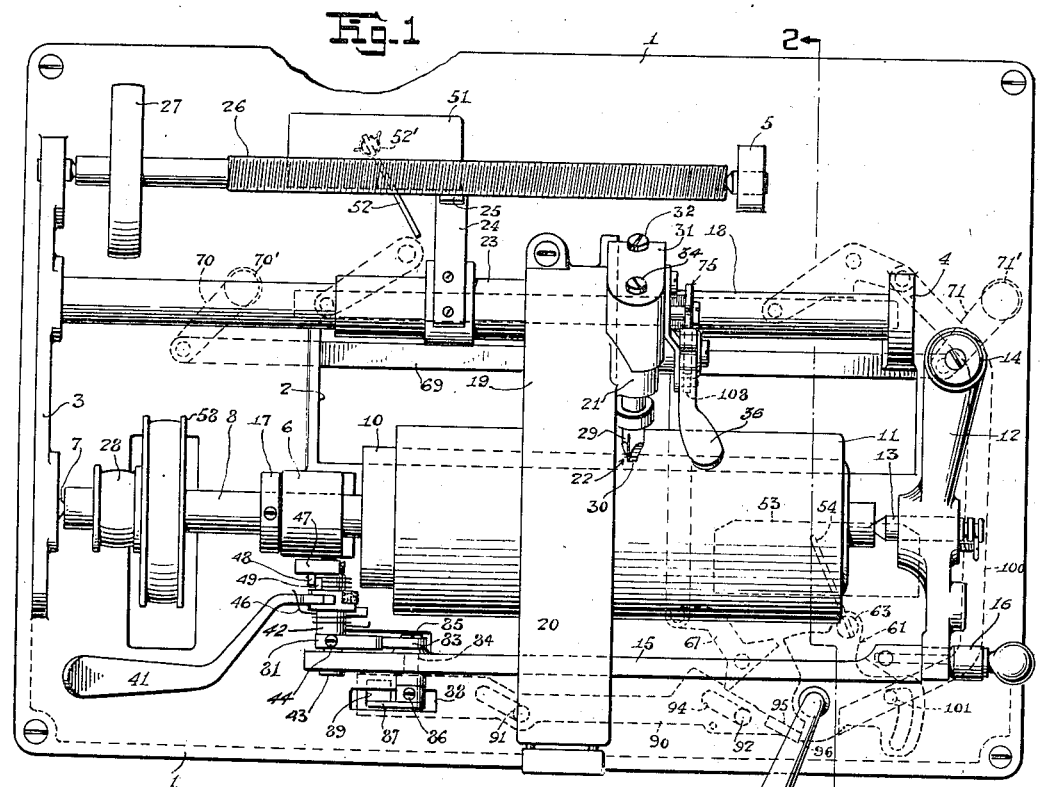
Figure 1 is a top plan view of a phonograph record shaving machine showing my invention as applied thereto.

Reference being had to Fig. 1 there will be seen a form of phonograph record shaving machine in which my invention is preferably employed. This machine comprises a base plate 1 having a left-hand standard 3, right-hand standards 4 and 5, and an intermediate standard 6. In the standard 3 there is provided a conically pointed stud 7 which engages a recess in the left end of a shaft 8, thereby providing a thrust bearing for the shaft. The shaft 8 passes through an oversized hole 9 (see Fig. 3) in the intermediate standard 6 and is provided with a mandrel 10 for holding a suitable record 11 to be resurfaced. The right end of the shaft 8 is supported by an end-gate 12 carrying an adjustable conical stud 13 adapted to engage a recess in the right end of the shaft 8 and be biased thereagainst.

The end-gate 12 is pivoted to a boss 14 on the base plate 1 so that it may be opened or swung outwardly from a supporting position to a non-supporting position wherein it is free of the right end of the mandrel 10, thereby permitting a record to be mounted on or to be removed from the mandrel. The end-gate 12 may be closed or moved into its supporting position by imparting a clockwise movement thereto until its forward extremity impinges against the right end of a guide rail 15, in which position it may be releasably held by a suitable latch 16. When the end-gate 12 is open the shaft 8 is intermediately supported by the intermediate standard 6, in which case the shaft 8 will tend to move rightwardly free of the stud 7 at its left end, but such movement is restricted by the impingement of a collar 17 secured to the shaft, with the left side of the standard 6.

Figure 2:
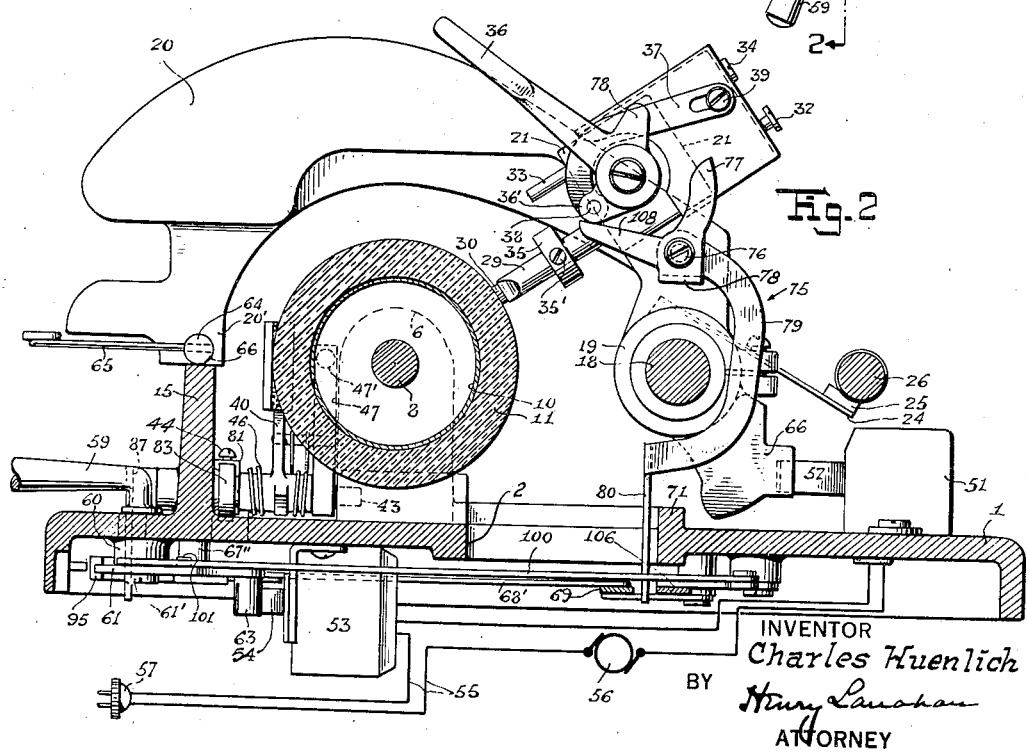
Fig. 2 is a vertical cross-sectional view taken along the line 2—2 of Fig. 1.

When the end-gate 12 is in its supporting position the mandrel is rotatably supported in an operative position in which the mandrel is in true parallel relation with respect to the guide rail 15. Supported by the left and right standards 3 and 4 is a longitudinal rod 18 which is also in true parallel relation with the guide rail 15 and on which there is slidably and tiltably mounted a carriage 19, the carriage being provided with a sleeve bearing 23 embracing the rod 18. This carriage is also provided with an approximately semi-circular and forwardly extending arm portion 20 having a downwardly extending shoe portion 20' disposed directly above and supported by the guide rail 15. On the carriage arm 20 there is a ball-shaped weight or hand piece integrally formed with the arm portion 20 and located substantially above the guide rail 15, as shown in Fig. 2.

On the right-hand side of the carriage 19 there is a boss 21 which substantially overlies the longitudinal rod 18. The boss 21 supports a resurfacing tool 22 which is mounted for movement into operative position with respect to the record; when the resurfacing tool is in such position it will cut away a surface layer of the record material as the record is rotated and the carriage 19 is steadily moved transversely of the direction of record rotation. (This cut away layer may pass through an opening 2 in the base plate 1 so as to be collected by a suitable container beneath the plate.) In order that such transverse movement, or longitudinal movement with respect to the record 11, may be imparted to the carriage 19 by the rotation of the mandrel 10, the carriage is provided with a rearwardly extending and resilient arm 24 mounted on the sleeve bearing 23 and carrying a feed nut 25. When the carriage arm 20 is in its normal lowered or operative position, the shoe 20' being supported by the guide rail 15, the feed nut 25 engages the underside of a feed screw 26 rotatably held in the left and right standards 3 and 5 and provided with a pulley 27 which is adapted to be coupled, as by a suitable belt, to a pulley 28 located on the shaft 8. A rotation of the mandrel 10 will then provide rotational movement of the feed screw 26 to effect a longitudinal movement (in a left-hand direction) of the carriage 19 with respect to the mandrel. It will be understood that with this arrangement an upward tilting movement of the arm 20 will cause the resurfacing tool 22 to be moved away from the record 11, and the feed nut 25 to be moved downwardly out of engagement with the feed screw 26, thereby permitting the carriage to be manually moved, at will, along the record 11. Such upward tilting movement of the carriage arm is however adapted to be limited by the impingement of a rearwardly and downwardly extending arm 66 on the carriage with a stop 71 suitably comprising a reenforcing rib extending along the rear edge of the opening 2.

The resurfacing tool 22 comprises a knife bar 29 carrying a knife blade 30 at its inner or lower end. The knife bar 29, which is slidably mounted in an opening provided in the boss 21, is movable towards and away from the record 11 so as to move the resurfacing tool 22, or the knife blade 30 which forms a part thereof, into and out of operative position with respect to the record 11. Although my invention is not limited as to the form of knife setting mechanism to be used, I preferably employ a form such as is disclosed in Brown Patent No. 2,137,383, issued November 22, 1938, and entitled "Record shaving machine". This mechanism may be briefly described as follows:

The outer or upper end portion of the knife bar 29 extends loosely through the top wall of a hollow cap 31 which fits slidably over the boss 21. Upward or rearward movement of the cap 31, with respect to the knife bar 29, is limited by a head 32 provided on the upper extremity of the knife bar. The cap 31 is resiliently coupled to the knife bar 29 so that, as the cap 31 is moved downwardly or towards the record 11, the knife bar 29 is yieldingly moved downwardly to bring the knife blade 30 into engagement with the record. The cap 31 is guided by means of a guide rod 33 secured to the cap 31 by means of a headed screw 34 and slidably held in an opening which extends through the boss 21 in parallel relation to the opening through which passes the knife bar 29. In order that the resurfacing tool 22 will be normally maintained in an upward or inoperative position, the cap 31 is suitably biased upwardly. Such upward or inoperative position of the resurfacing tool 22 is determined by the abutment of a collar 35, which is secured to the lower or inner end portion of the knife bar 29 by a set screw 35', with the underside of the boss 21.

The setting of the resurfacing tool 22 into operative position is effected by means of an actuating lever 36 which is pivotally mounted on the right side of the boss 21. A downward swinging movement of the lever 36 is adapted to move the cap 31 downwardly for yieldingly moving the resurfacing tool into operative engagement with respect to the record 11. The lever 36 is provided with a short arm extension 36' which is coupled by means of a link member 37 to the cap 31, the link member being connected to the arm extension 36' by the pivot screw 38, and to the cap member 31 by the pivot screw 39. The lower portion of the link member 37 has a gooseneck form or shape so that it will remain clear of the hub of the lever 36 as the lever is swung downwardly in the setting of the resurfacing tool; the gooseneck portion however is adapted to engage the hub of the lever 36 to limit the downward movement of the lever to a position in which the axis of the pivot screw 38 is slightly past dead center with respect to the pivot axis of the lever 36 and the pivot screw 39. It will therefore be apparent that the lever 36 is releasably locked whenever it is in its terminal or downmost position by reason of the upward biasing force exerted upon the cap 31. It is further apparent that a slight upward or "tripping" movement imparted to the lever 36 to return the pivot screw 38 across the dead center line aforementioned will effect the release of the resurfacing tool from set position, by reason of the upward biasing force exerted upon the cap 31.

For facilitating the removal of a record from the mandrel 10 there is provided a record ejector comprising a record-ejecting arm 40 and an operating arm 41 having a common hub 42 which is mounted on a shaft 43 and firmly secured thereto by means of a set screw 44, the shaft 43 being rotatably supported between the guide rail 15 and the standard 6. The record-ejecting arm extends substantially vertically upwardly when the record ejector is in an inoperative position as shown in Fig. 3, and carries a record-engaging shoe 45 pivotally connected thereto and positioned slightly to the left of the adjacent end of the record 11 mounted on the mandrel 10. The inoperative position of the record ejector is determined by the abutment of a projection 41' provided on the arm 41 with the base plate 1. The record ejector is normally maintained in such position by means of a coil spring 46 adapted to urge the arm 41 in a counter-clockwise direction. In operating the record ejector the operating arm 41 is swung in a clockwise direction so as to bring the record-engaging shoe 45 into contact with the record for pushing the record off the mandrel 10, the mandrel 10 being slightly tapered so that the record 11 may closely fit the mandrel and be yieldably held thereon by the friction between the record and the mandrel.

Whenever a record is to be removed from the mandrel 10 it is important that the mandrel have first stopped rotating. In operation, the mandrel 10 will continue to rotate after the power, which operates to rotate the mandrel, has been turned off, by reason of the inertia of the mandrel and of the rotating parts of the driving means provided therefor. In order that the record ejector may be safely operated immediately after the power for the driving means has been shut off, there is commonly provided a mandrel brake which is operated incidental to the act of operating the record ejector. The mandrel brake comprises an arm 47 also pivotally mounted on the shaft 43 and carrying at its upper end a shoe 47', commonly made of felt, which is adapted to contact the adjacent end of the mandrel 10 for retarding, by friction, the rotation of the mandrel. The brake arm 47 is provided with a forwardly extending pin 48 which is resiliently connected to a rearwardly extending pin 49 provided on the record-ejecting arm 40 and extending along the right side of the pin 48, as shown in Figs. 1, 3 and 4, the resilient connection being effected by a spring 50 which is coiled about the hub 42 and hooked at its ends about the respective pins 48 and 49. By these means the brake arm 47 is yieldingly moved in a clockwise direction so as to urge the brake shoe 47' against the end of the mandrel as the record-ejecting arm 40 is operated to remove a record from the mandrel.

The above described structure and mechanism are common to record shaving machines heretofore manufactured and used, and form a part of the present invention only in so far as they are related to or combined with other mechanism hereinafter described.

The operation of a shaving machine may be facilitated by the provision of control means which will automatically stop the machine at the end of a tool-record traversal so that the operator may then immediately examine the record to determine if a sufficiently smooth surface has been obtained. It may not however be desirable to automatically release the resurfacing tool from operative position at the end of such tool-record traversal since there may at times be the need for taking a second or finishing cut after the first or rough cut has been taken in order to secure an added smoothness to the record. Such finishing cut is enabled by the provision of a suitable second or finishing-cut controlling means which is operable to advance the resurfacing tool a predetermined extent towards the record. When the finishing-cut controlling means is so operated and the carriage is returned to initial position, the machine is in condition to be restarted for effecting the finishing-cut operation. If, upon inspecting a record after a first or heavy cut has been taken, the operator decides to take another heavy cut on the same record, he will release the resurfacing tool from operative position and then move the tool to a position overlying the record so that it may be reset. Since such setting can be made only when the record is stationary, it is advantageous that the machine be suitably conditioned so that it will remain stopped or inoperative as the carriage is returned from its terminal position to a suitable position permitting the resetting of the tool. When the tool is properly reset and the carriage is returned to initial position, the machine will be in condition to be restarted for effecting the resurfacing operation. If, on the other hand, upon inspecting the record after a heavy cut has been taken, the operator decides that the record surface is sufficiently smooth, he will want to remove the record so that the machine may be conditioned for reoperation. Such conditioning involves the removal of the resurfaced record, the release of the resurfacing tool from operative position, the mounting of a new record on the machine, and the suitable conditioning of the machine so that it will again remain stopped as the carriage is returned from its terminal position to a position permitting the resetting of the resurfacing tool. When the resurfacing tool is properly set and the carriage is returned to initial position, the machine will be in condition to be restarted for the resurfacing operation. In my invention I provide means whereby the above operations are adapted to be conveniently carried out in their proper sequence. The means comprising my invention are now described in detail.

In order that the machine will be automatically stopped at the end of a tool-record traversal, I provide a control switch 51 which is automatically operated to "stop" or "off" position by the terminal movement of the carriage. The switch 51 may be of any desirable single-pole single-throw variety having an actuating arm 52 suitably biased rightwardly into "start" or "on" position, as by a spring 52' as shown in Fig. 1. This switch 51 is preferably located on the top side of the base plate in the left rearward portion thereof. As the carriage moves leftwardly its rearwardly extending arm 66 is adapted to contact the actuating arm 52 to move it leftwardly and thereby operate the switch into "off" position so as to stop the machine when the carriage reaches its terminal position.

When the operator desires to take a finishing cut he may operate a finishing-cut controlling means suitably comprising a cross rod 64 extending radially throughout its length slightly below the lower extremity of the shoe 20' of the carriage arm and provided also throughout its length with a flat 66. Secured to the rod 64 is an operating arm 65 by which the rod may be manually turned. When this arm is in a forward or inoperative position, the flat 66 is turned away from its most downward position, as shown in Fig. 2. The guide rail 15 will then support the carriage arm by way of the rod 64. As the arm 65 is moved upwardly into an operative position the rod 64 is turned in a clockwise direction so as to move the flat 66 into contact with the guide rail 15, thereby lowering the carriage arm. The resurfacing tool 22 is then also lowered or advanced a predetermined extent towards the record.

To condition the machine for the finishing cut, the operator will operate the finishing-cut controlling means and will tilt the carriage arm upwardly so as to disengage the feed nut 25 from the feed screw 26. The carriage is then free so that it may be returned to initial position. As the carriage is moved through the first portion of its return travel, the actuating arm 52 will move rightwardly, by reason of the biasing force urging it in that direction, to operate the switch 51 into "on" position and thereby automatically restart the machine. Upon the full return of the carriage the machine is in condition to perform the finishing cut on the record.

In order that the machine may be conditioned so that it will remain stopped or inoperative, as the carriage is returned from its terminal position after a tool-record traversal, such as is desired when another heavy cut is to be taken on the same or on a subsequent record, I provide another control switch 53 which is adapted to be manually operated, but which is also in some cases to be automatically operated as is hereinafter described. The switch 53 may be of the single-pole single-throw toggle variety having an actuating arm 54 which may be snapped into its respective "off" and "on" positions. For a suitable operation of the machine the switches 51 and 53 are preferably serially connected in a power circuit 55 adapted for connecting a motor 56 with a suitable source of power, by way of a plug 57, as schematically represented in Fig. 2. Thus each of the switches must be in "on" position in order to put the motor 56 into operation, whereas the operation of either switch to "off" position will open the power circuit to put the motor 56 out of operation. The motor 56 may be of any suitable variety coupled, as by a belt, to a pulley 58 secured to the shaft 8, for imparting rotational movement to the mandrel 10 and longitudinal movement (in a left hand direction) to the carriage 19.

The switch 53 is preferably secured to the underside of the base plate 1 in the right forward portion thereof and is manually operable by means of a forwardly extending control lever 59. This lever has a shaft 59' extending downwardly through a boss 60 on the underside of the plate 1. Secured to the lower end of the shaft 59', as by a shoulder screw 61', is a plate 61 formed to have a rearwardly extending arm 62 carrying a slotted and pivoted stud 63 through which slidably passes the operating arm 54 of the switch 53. Thus leftward and rightward rocking movements of the control lever 59 will impart rightward and leftward rocking movements to the operating arm 54, the switch 51 being adapted to be thereby operated into its respective "on" and "off" positions.

When the carriage is returned, as after a tool-record traversal, to condition the machine for another heavy cut on the same record, it is important that the resurfacing tool be first released from operative position and particularly that the machine be not restarted should the operator inadvertently forget to release the resurfacing tool before such carriage return is started. Unless the switch 53 is in "off" position, the record will resume rotation as the carriage is returned, as by the automatic operation of the switch 51 into "on" position. Such record rotation will act as a warning to the operator that the machine is improperly conditioned. He will then tend to move the carriage back to its terminal position to effect such proper conditioning. In order to constrain upon the operator to release the resurfacing tool from operative position before the carriage is returned, I provide locking means which prevent the manual operation of the control switch 53 from "on" to "off" position while the resurfacing tool is in operative position.

This locking means, coupling the resurfacing tool 22 with the control switch 53, comprises a locking member 67 (see Figs. 1 and 4) having a short arm 67' extending into the path of a shoulder 61" on the plate 61 for locking the switch 53 in "on" position. The locking member 67 is pivoted on a downwardly extending boss 67" on the base plate 1, and is provided with a leftwardly extending arm 68 pivotally connected to a link member 68' which extends rearwardly and pivotally connects at its rearward end with a transverse or longitudinal bar 69. The bar 69 is supported by the base plate 1 by way of a pair of left and right parallel motion links 70 and 71, suitably pivotally connected at their rearward ends to the respective bosses 70' and 71' on base plate 1 and at their forward ends to the bar 69.

The bar 69 is adapted to be maintained in a normal unoperated position, with the locking member 67 in a locking position as shown in Fig. 1, by means of a tension spring 72 urging the arm 68 against a stop 73 on the base plate 1, the spring 72 being connected between the arm 68 and a pin 74 on the base plate. However, as the resurfacing tool 22 is moved into inoperative position the bar 69 is suitably moved forwardly to move the locking member 67 out of a locking position. The means coupling the bar 69 with the resurfacing tool 22 comprises an angular lever 75, shown in Figs. 2 and 4. This lever is pivoted on the right side of the carriage on a long shoulder screw 76 and has an upwardly extending arm 77 adapted to engage with a cam face 78 on the tool setting lever 36 for turning the lever 75 in a clockwise direction as the lever 36 is moved upwardly for releasing the resurfacing tool. The arm 77 of the lever 75 is suitably offset to the right, being pivoted on the outer end of the shoulder screw 76 and connected by a bail 78 to the intermediate portion 79 which is pivoted on the inner end of the shoulder screw 76 adjacently of the carriage; the intermediate portion 79 is substantially U-shaped and extends downwardly about the longitudinal rod 18; and the lower end portion 80 of the portion 79 is turned over and extended downwardly through the opening 2 behind the longitudinal bar 69. As the resurfacing tool is released from operative position the lever 75 is turned in a clockwise direction by the engagement of the cam face 78 with the arm 77, and the bar 69 is therefore moved forwardly, by the impingement of the lower end portion 80 of the lever 75 with the bar so as to unlock the switch 53.

To facilitate the conditioning of the machine for reoperation on a subsequent record, I automatically release the resurfacing tool from operative position and operate the switch 53 to "off" position as an incident of ejecting a record from the machine. This automatic operation also acts to prevent the operator from inadvertently misoperating the machine since, upon the removal of a record from the machine, the resurfacing tool is released so that it will be free of a newly mounted or subsequent record and the machine is conditioned so that it will not be restarted, as the carriage is returned for the resetting of the resurfacing tool.

A means provided for coupling the switch 53 with the record ejector is arranged so as to first render the switch locking member 67 inoperative and then to operate the switch 53 into "off" position as the record ejector is operated. These means are best shown in Fig. 4 and comprise a rocker arm 81 provided on the hub 42 of the record ejector. The rocker arm 81 coacts with another rocker arm 83 secured to the rearward end of a transverse shaft 84 by means of a headed screw 85, the shaft 84 being journalled in the lower portion of the guide rail 15. Secured to the forward end of the shaft 84, as by the set screw 86, is a rocker arm 87 which extends downwardly through an opening 88 in the base plate 1. The lower end portion of the arm 87 passes through an opening 89 provided in the left end of a rightwardly extending bar 90 biased in a leftward direction by a tension spring 97 connected between a pin 98 on the forward turned down edge of the base plate 1 and an ear 99 on the bar 90. The bar 90 is slidably supported by the shoulder screws 91 and 92 which pass through the respective slots 93 and 94 and thread into suitable bosses provided on the under side of the base plate 1, the slots 93 and 94 being suitably inclined forwardly, and the opening 89 being suitably widened so that the bar 90 may move in a rightward and forward direction. The right end of the bar 90 is provided with a suitable turned over lug 95 adapted to abut against a short arm 96 on the plate 61, as the bar 90 is moved for operating the switch 53. The right end portion of the bar 90, along the rearward edge thereof, is also provided with a cam face 90' engaging a short arm 90'' of the locking member 67 so that this locking member will be moved into an unlocking position by the initial rightward movement of the bar 90.

As operation of the actuating lever 41 of the record ejector is started, the rocker arm 81 is moved in a clockwise direction so as to impinge upon the rocker arm 83 and thereby move it in a counter-clockwise direction. The arm 87 is then also moved in a counter-clockwise direction so as to cause the bar 90 to be moved in a rightward and forward direction. The initial movement of the bar 90 causes the locking member 67 to be moved in a counter-clockwise direction, and into an unlocking position, by the engagement of the cam face 90' with the arm 90'' of the locking member. Although the plate 61 is also turned by such initial movement of the bar 90, there is provided sufficient lost motion between the locking member 67 and shoulder 61'' of the plate 61 to prevent any jamming action therebetween. As the lever 41 is moved through the first portion of its travel, the bar 90 is moved sufficiently to cause the switch 53 to be operated from "on" to "off" position. As the actuating lever 41 is moved through the next portion of its travel it brings the mandrel brake shoe 47' into engagement with the mandrel 10. As the actuating lever 41 is then moved through the last portion of its travel the ejector shoe 45 is brought into contact with the adjacent end wall of the record 11 so as to push the record off of the mandrel 10.

The operation of the actuating lever 41 through such last portion of its travel causes the lug 95 of the bar 90 to be moved in front of the arm 96 of the plate 61 so that the switch 53 becomes locked in "off" position. This is a safety feature preventing the operator from accidentally puting the record-rotating means, or motor 56, into operation while the record ejector is in an operated position.

In order that the resurfacing tool 22 may also be released from operative position, in addition to the operation of the switch 53 from "on" to "off" position, as the record ejector is operated, the switch 53 is operatively connected with the resurfacing tool 22, as shown in Fig. 4, by a mechanism comprising an angular link member 100 carrying a pin 101 near its forward end which cooperates with a cam slot 102 provided in a rightwardly extending portion of the plate 61. The link member 100 extends suitably rearwardly and pivotally connects, at its rearward end, to the end of a lever 103 which is pivoted by a shoulder screw 104 to a boss 105 projecting downwardly from the lower side of the base plate 1. The lever 103 is pivotally connected at its other end to a transverse bar 106 which is disposed in parallel relation to the longitudinal rod 18 and which extends slightly below the rear edge of the opening 2. The bar 106 is supported at its left end by a link 107 pivotally connected at one end to the bar 106 and at the other end to a downwardly extending boss 108' on the base plate. By this arrangement the lever 103 and the link 107 form a pair of parallel motion supports for the bar 106 so that it may move forwardly and rearwardly in parallel movement.

The bar 106 is adapted to be operatively connected with the resurfacing tool 22 by means of the angular lever 75 hereinbefore partially described, the bar 106 being arranged so that the lower end portion 80 of the lever 75 extends downwardly in front of the bar. The lever 75 is provided with a forwardly extending arm 108 to contact the under side of the short arm 36' of the actuating lever 36 when the lever 36 is in its downwardmost or operated position. A clockwise movement of the lever 75 will then impart a clockwise or upward "tripping" movement to the actuating lever 36 to effect the release of the resurfacing tool 22 from set position. Such clockwise movement of the lever 75 is effected by the operation of the switch 53 from "on" to "off" position.

The cam slot 102 in the plate 61 is disposed substantially in an arc about the shaft 59' of the lever 59, and has at its rearward end an inwardly and substantially radially extending notch 109. The pin 101 is adapted to be maintained in the notch 109, as by a tension spring 110 (see Figure 4) urging the link member 100 leftwardly and forwardly, when the switch 53 is in "on" position, the spring 110 being connected between a pin 110' on the base plate 1 and the rearward portion of the link 100. The link member 100 is extended forwardly of the pin 101 and provided with an end cam face 100' adapted to abut against the boss 60 as the control lever 59 is operated to "off" position. In the first portion of such movement of the control lever 59, the pin 101 remains in the notch 109 to impart a rearward movement to the link 91 and a counterclockwise movement to the lever 103, thereby effecting a forward movement of the bar 106. In the forward movement of the bar 106, it contacts the lever 75 and turns it in a clockwise direction to release the resurfacing tool from set position. In the next further movement of the control lever 59 to "off" position the cam face 100' abuts against the side of the boss 60 so as to move the pin 101 out of the notch 109. The link 100 will then move forwardly, as by means of the spring 110, with the pin 101 coming to rest in the forward end portion of the cam slot 102, such forward movement of the link 100 being limited by the impingement of a lug 103' on the lever 103 with the rear edge of the bar 106.

In the movement of the control lever 59 from "off" to "on" position the pin 101 will slide rearwardly in the cam slot 102, and then snap over into the notch 109, by the force of the spring 110, as the control lever 59 reaches the end of its travel. The bar 106 is thus maintained in its most rearward position by the spring 110 during such movement of the control lever 59. Consequently the resurfacing tool 22 may be properly set into operative position while the switch 53 is in "off" position since the operation of the switch 53 from "off" to "on" position will not affect such tool setting. Although the switch 53 is locked against manual operation from "on" to "off" position while the resurfacing tool is set, it may be so operated as an incident of operating the record ejector as hereinbefore described, which operation automatically effects the release of the resurfacing tool from set position.

Although I have shown and described a preferred embodiment of my invention, it will be understood that this embodiment is illustrative of my invention and not limitative thereof. The embodiment herein shown is subject to many changes and modifications without departure from the scope of my invention, which I undertake to express according to the following claims.

I claim:

1. In a phonograph record shaving machine having means for rotating a record, and a carriage movable along the record: the combination of a switch operable between "off" and "on" positions to control said record-rotating means; a resurfacing tool on said carriage settable into operative position relative to the record; and means, controlled by said tool, for rendering said switch inoperable from "on" position to "off" position when said resurfacing tool is in operative position.

2. In a phonograph record shaving machine having a carriage: in combination, an "on" and "off" switch for controlling the operation of the machine; a resurfacing tool on said carriage movable into operative and inoperative positions; means for locking said switch in "on" position; and means, automatically operated as an incident of moving said resurfacing tool out of operative position, for rendering said locking means inoperative.

3. In a phonograph record shaving machine having record-supporting means: in combination, an "on" and "off" switch for starting and stopping the machine; a record ejector; and means, connecting said switch with said ejector, for operating said switch from "on" to "off" position as said record ejector is operated.

4. In a phonograph record shaving machine having means for supporting a record and a carriage movable across the record: in combination, a manual switch operable between "on" and "off" positions to start and stop the machine; restricting means for rendering said switch inoperable from "on" position to "off" position; a record ejector; and means, operated incidental to the operation of said record ejector, for rendering said restricting means inoperative and operating said switch from "on" to "off" position.

5. In a phonograph record shaving machine having means for supporting a record and a carriage movable across the record: in combination, a manual switch operable between "on" and "off" positions to start and stop the machine; means for restricting the operation of said switch; a record ejector; and means for rendering said restricting means inoperative as an incident of operating said record ejector.

6. In a phonograph record shaving machine having means for supporting a record and a carriage movable across the record: in combination, an "on" and "off" switch for starting and stopping the machine; a resurfacing tool on said carriage movable into operative position with respect to the record; a record ejector; and means, operable only when said switch is in "on" position, for moving said resurfacing tool out of operative position as an incident of operating said record ejector.

7. In a phonograph record shaving machine having means for supporting a record, record-rotating means, a carriage movable along the record, and carriage-advancing means: the combination of an "on" and "off" switch for controlling said record-rotating means and carriage-advancing means; a resurfacing tool on said carriage movable to operative position relative to the record; a record ejector; and means, actuated incidental to the operation of said record ejector, for moving said resurfacing tool out of operative position and operating said switch from "on" position to "off" position.

8. In a phonograph record shaving machine having record-supporting means: in combination, an "on" and "off" switch for starting and stopping the machine; a resurfacing tool movable into operative and inoperative positions; restricting means for rendering said switch inoperable from "on" position to "off" position; a record ejector; and means, actuated incidental to the operation of said record ejector, for rendering said restricting means inoperative, operating said switch from "on" to "off" position, and moving said resurfacing tool out of operative position.

9. In a phonograph record shaving machine having means for supporting a record and a carriage movable across the record: in combination, a resurfacing tool on said carriage movable into operative position with respect to the record; a record ejector; and means, operable irrespective of the position of said carriage in its path, for moving said resurfacing tool out of operation position as an incident of operating said record ejector.

10. In a phonograph record shaving machine having a mandrel for supporting a record: in combination, an "on" and "off" switch for controlling the operation of the machine; a resurfacing tool movable into operative position relative to the record; a record ejector; a mandrel brake operatively connected with said record ejector; and means, actuated incidental to the operation of said record ejector, for rendering said mandrel brake operative, operating said switch from "on" to "off" position, and moving said resurfacing tool out of operative position.

11. In a phonograph record shaving machine having rotatable record-supporting means: in combination, an "on" and "off" switch for starting and stopping the machine; a record ejector; an operating lever; a brake for said record-supporting means; and means, operatively connected with said lever, for operating said switch from "on" to "off" position as said lever is moved through the first portion of its travel, for rendering said brake operative as said lever is moved through a remaining further portion of its travel, and for operating said ejector as said lever is moved through the terminal part of said remaining portion.

12. In a phonograph record shaving machine having means for supporting a record, record-rotating means, a carriage movable along the record, and carriage-advancing means: the combination of an "on" and "off" switch for controlling said record-rotating means and carriage-advancing means; a record ejector; a control member; means for operating said switch from "on" to "off" position as said control member is moved through a first portion of its travel; and means automatically operated incidental to the act of moving said control member through a remaining further portion of its travel for rendering said record ejector operative.

13. In a phonograph record shaving machine having means for supporting a record and a carriage movable across the record: in combination, an "on" and "off" switch for controlling the operation of the machine; a resurfacing tool on said carriage movable into operative position relative to the record; a record ejector; a control member; means for coordinately operating said switch from "on" to "off" position and moving said resurfacing tool out of operative position, as said control member is moved through a first portion of its travel; and means, automatically operated incidental to the act of moving said control member through a remaining further portion of its travel, for rendering said record ejector operative.

14. In a phonograph record shaving machine having means for supporting a record, record-rotating means, a carriage movable along the record, and carriage-advancing means: the combination of an "on" and "off" switch for controlling said record-rotating means and carriage-advancing means; a record ejector; and means, operatively connecting said switch with said ejector, for locking said switch in "off" position when said ejector is in an operated position.

15. In a phonograph record shaving machine having means for supporting and rotating a record and a carriage movable across the record: the combination of a pair of serially connected "on" and "off" switches for controlling said record-rotating means; a record ejector; means for automatically operating one of said switches to "off" and "on" positions by respective forward and return movements of said carriage; and means, operatively connecting said record ejector with the other of said switches, for operating said other switch to "off" position as said record ejector is operated.

16. In a phonograph record shaving machine having means for supporting a record, record-rotating means, a carriage movable along the record, and carriage-advancing means: the combination of a pair of serially connected "on" and "off" switches adapted to control said record-rotating means and carriage-advancing means; a resurfacing tool on said carriage movable into operative position relative to the record; means for automatically operating one of said switches to "off" and "on" positions by the respective forward and return movements of said carriage; a record ejector; and means, controlled by said record ejector, for moving said resurfacing tool out of operative position and operating the other of said switches to "off" position as said record ejector is operated.

17. In a phonograph record shaving machine having means for supporting a record: in combination; a start and stop means for controlling the operation of the machine; a carriage movable across the record between initial and terminal positions; a record ejector; means, controlled by said carriage, for placing said control means in stop position as said carriage is moved into its terminal position; and means, automatically operated as an incident of operating said record ejector, for conditioning said control means to be releasably maintained in stop position as said carriage is returned into its initial position.

18. In a phonograph record shaving machine having record-supporting means: in combination, a start and stop means for controlling the operation of the machine; a record ejector; a resurfacing tool movable into an operative position; a control member; and means for moving said resurfacing tool out of operative position, operating said control means into stop position, and rendering said record ejector operative, incidental to the operation of said control member.

CHARLES HUENLICH.